United States Patent
Nagao

(10) Patent No.: US 12,549,409 B2
(45) Date of Patent: Feb. 10, 2026

(54) SEMICONDUCTOR DEVICE AND COMMUNICATION SYSTEM FOR UPDATING SETTING DATA OF MULTIPLE CHANNELS

(71) Applicant: ROHM CO., LTD., Kyoto (JP)

(72) Inventor: Kei Nagao, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 18/753,679

(22) Filed: Jun. 25, 2024

(65) Prior Publication Data

US 2025/0016023 A1 Jan. 9, 2025

(30) Foreign Application Priority Data

Jul. 5, 2023 (JP) .................. 2023-110918

(51) Int. Cl.
*G06F 13/16* (2006.01)
*H04L 12/40* (2006.01)

(52) U.S. Cl.
CPC .... *H04L 12/40013* (2013.01); *G06F 13/1605* (2013.01); *H04L 2012/40215* (2013.01)

(58) Field of Classification Search
None
See application file for complete search history.

(56) References Cited

U.S. PATENT DOCUMENTS

| | | | | |
|---|---|---|---|---|
| 5,598,541 A * | 1/1997 | Malladi | ............... | H04L 49/357 709/212 |
| 8,450,949 B2 * | 5/2013 | Jheng | ............... | H05B 45/10 315/297 |
| 9,253,850 B2 * | 2/2016 | DeNicholas | ........... | H05B 45/48 |
| 10,070,491 B2 * | 9/2018 | DeNicholas | ......... | H05B 45/375 |
| 2011/0285325 A1 * | 11/2011 | Jheng | .................... | H05B 45/10 315/312 |

(Continued)

FOREIGN PATENT DOCUMENTS

| | | | | |
|---|---|---|---|---|
| JP | 2017-224946 | | 12/2017 | |
| WO | WO-2012045478 A1 * | | 4/2012 | ........... H05B 45/375 |
| WO | WO-2025009328 A1 * | | 1/2025 | ........... H05B 47/165 |

OTHER PUBLICATIONS

Machine Translation of Japanese Patent Application JP 2008040697 A, published 2006. (Year: 2006).*

(Continued)

*Primary Examiner* — Steven G Snyder
(74) *Attorney, Agent, or Firm* — Fish & Richardson P.C.

(57) ABSTRACT

A semiconductor device includes: an interface configured to receive write data transmitted via serial communication from outside; a register configured to store setting data corresponding to multiple channels; and an update controller configured to update the setting data based on the write data, wherein the write data includes first data comprising a plurality of bits corresponding to the multiple channels, respectively, each bit among the plurality of bits indicating whether or not there is a data update for a corresponding channel among the multiple channels; and second data comprising one or more update values of the setting data respectively for one or more channels, among the multiple channels, for which the first data indicates whether there are one or more data updates.

16 Claims, 11 Drawing Sheets

(56) References Cited

U.S. PATENT DOCUMENTS

| | | | | |
|---|---|---|---|---|
| 2013/0099702 A1* | 4/2013 | Williams | ............... | H05B 45/48 |
| | | | | 315/363 |
| 2013/0313973 A1* | 11/2013 | DeNicholas | ........... | H05B 45/10 |
| | | | | 307/115 |
| 2016/0088699 A1* | 3/2016 | DeNicholas | ........... | H05B 45/10 |
| | | | | 315/186 |

OTHER PUBLICATIONS

Machine Translation of Japanese Patent Application JP 2012221714 A, published 2012. (Year: 2012).*

Machine Translation of Chinese Patent Application CN 104641412 B, published 2018. (Year: 2018).*

"TLC59731 3-Channel, 8-Bit, PWM LED Driver With Single-Wire Interface (EasySet)" datasheet from Texas Instruments, Oct. 2016. (Year: 2016).*

"TLC5940 16-Channel LED Driver With DOT Correction and Grayscale PWM Control" datasheet from Texas Instruments, Nov. 2015. (Year: 2015).*

"Can You Put LED Drivers In Parallel?" by uPowerTek, Dec. 24, 2021. (Year: 2021).*

"What is PWM Dimming For LED Driver" by uPowerTek, Dec. 24, 2016. (Year: 2016).*

"LED Control (LEDC)" from espressif.com, archived on Dec. 6, 2022. (Year: 2022).*

\* cited by examiner

FIG. 5

| Address | Bit[7] | Bit[6] | Bit[5] | Bit[4] | Bit[3] | Bit[2] | Bit[1] | Bit[0] |
|---------|--------|--------|--------|--------|--------|--------|--------|--------|
| 0x4B    | DIMSET01[11:4] |||||||| 
| 0x4C    | DIMSET02[11:4] |||||||| 
| 0x4D    | DIMSET03[11:4] |||||||| 
| ...     | ............... |||||||| 
| 0x62    | DIMSET24[11:4] ||||||||

FIG. 6

| Address | Bit[7] | Bit[6] | Bit[5] | Bit[4] | Bit[3] | Bit[2] | Bit[1] | Bit[0] |
|---|---|---|---|---|---|---|---|---|
| 0x7B | PAFLG[7:0] | | | | | | | |
| 0x7C | PAFLG[15:8] | | | | | | | |
| 0x7D | PAFLG[23:16] | | | | | | | |
| 0x7E | DutyDT01 | | | | | | | |

...

| ***** | DutyDT0m |

FIG. 8

| Address | Bit[7] | Bit[6] | Bit[5] | Bit[4] | Bit[3] | Bit[2] | Bit[1] | Bit[0] |
|---|---|---|---|---|---|---|---|---|
| 0x4B | DIMSET01[11:4] | | | | | | | |
| 0x4C | DIMSET01[3:0] | | | | DIMSET02[3:0] | | | |
| 0x4D | DIMSET02[11:4] | | | | | | | |
| 0x4E | DIMSET03[3:0] | | | | DIMSET04[3:0] | | | |
| 0x4F | DIMSET03[11:4] | | | | | | | |

...

| Address | Bit[7] | Bit[6] | Bit[5] | Bit[4] | Bit[3] | Bit[2] | Bit[1] | Bit[0] |
|---|---|---|---|---|---|---|---|---|
| 0x6D | DIMSET24[3:0] | | | | DIMSET23[3:0] | | | |
| 0x6E | DIMSET24[11:4] | | | | | | | |

FIG. 9

| Address | Bit[7] | Bit[6] | Bit[5] | Bit[4] | Bit[3] | Bit[2] | Bit[1] | Bit[0] |
|---|---|---|---|---|---|---|---|---|
| 0x7B | PAFLG[7:0] | | | | | | | |
| 0x7C | PAFLG[15:8] | | | | | | | |
| 0x7D | PAFLG[23:16] | | | | | | | |
| 0x7E | SG01 | GAIN01[1:0] | | DUTY01[4:0] | | | | |

.............

| **** | SGm | GAINm[1:0] | | DUTYm[4:0] | | | | |

SEMICONDUCTOR DEVICE AND COMMUNICATION SYSTEM FOR UPDATING SETTING DATA OF MULTIPLE CHANNELS

CROSS-REFERENCE TO RELATED APPLICATION

This application is based upon and claims the benefit of priority from Japanese Patent Application No. 2023-110918, filed on Jul. 5, 2023, the entire contents of which are incorporated herein by reference.

TECHNICAL FIELD

The present disclosure relates to a semiconductor device and a communication system.

BACKGROUND

Semiconductor devices equipped with serial communication functions are used for various applications.

An example of circuit technology related to serial communication is disclosed in the related art.

BRIEF DESCRIPTION OF DRAWINGS

The accompanying drawings, which are incorporated in and constitute a part of the specification, illustrate embodiments of the present disclosure.

FIG. 5 is a register map showing storage of dimming setting data in a low resolution mode.

FIG. 6 is a register map related to settings for updating of dimming settings in a low resolution mode.

FIG. 8 is a register map showing storage of dimming setting data in registers in a high resolution mode.

FIG. 9 is a register map related to settings for updating of dimming settings in a high resolution mode.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Hereinafter, exemplary embodiments of the present disclosure will be described with reference to the drawings.

1. Communication System

Figure 1:
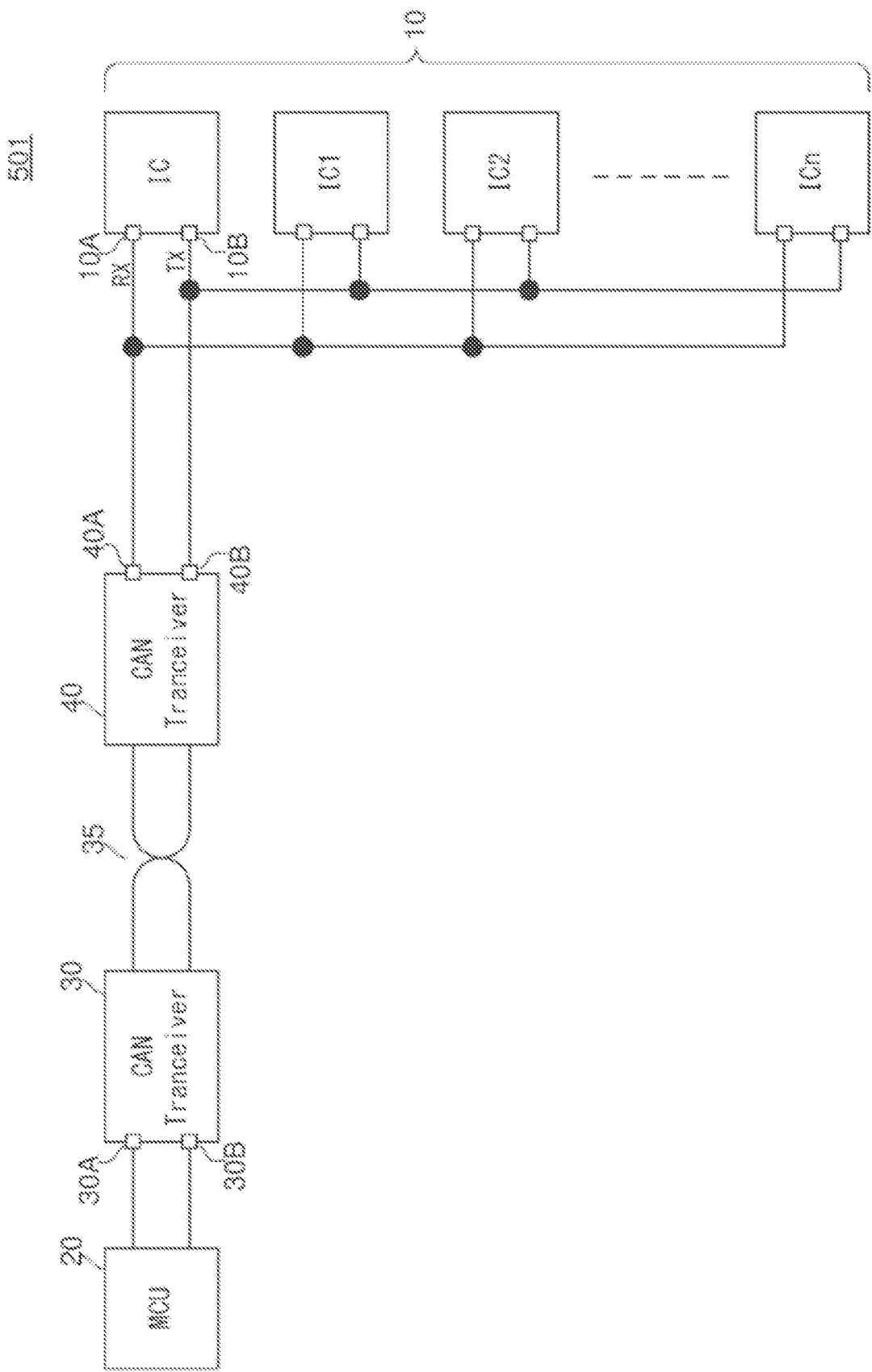
FIG. 1 is a diagram showing a configuration of a communication system according to an exemplary embodiment of the present disclosure.

FIG. 1 is a diagram showing a configuration of a communication system 501 according to an exemplary embodiment of the present disclosure. The communication system 501 includes a micro controller unit (MCU) 20, a controller area network (CAN) transceiver 30, a CAN transceiver 40, and a plurality of semiconductor devices 10. The communication system 501 is used in, for example, a vehicle.

Communication using a universal asynchronous receiver/transmitter (UART) is performed between the MCU 20 and the CAN transceiver 30. The UART is a protocol for exchanging serial data between two devices. In the UART, bidirectional communication using two lines is performed between a transmitting side and a receiving side.

Communication is performed between the CAN transceivers 30 and 40 via a CAN bus 35. The CAN is a serial communication protocol standardized by international standards such as ISO11898.

The CAN transceiver 30 has a TXD (transmission data input) terminal 30A and an RXD (reception data output) terminal 30B. The CAN transceiver 30 outputs data, which are input to the TXD terminal 30A, to the CAN bus 35, and outputs data, which are input from the CAN bus 35, from the RXD terminal 30B.

The CAN transceiver 40 has an RXD terminal 40A and a TXD terminal 40B. The CAN transceiver 40 outputs data, which are input to the TXD terminal 40B, to the CAN bus 35, and outputs data, which are input from the CAN bus 35, from the RXD terminal 40A.

Each semiconductor device 10 is an IC (Integrated Circuit) in which circuits with predetermined functions are integrated, and is configured as, for example, an LED (Light Emitting Diode) driver IC. All of the plurality of semiconductor devices 10 may be LED driver ICs, or some of the semiconductor devices 10 may be LED driver ICs. Details of the semiconductor device 10 as the LED driver IC will be described later.

The semiconductor device 10 has an RX (reception data input) terminal 10A and a TX (transmission data output) terminal 10B. The RX terminals 10A of the plurality of semiconductor devices 10 are connected in common to the RXD terminal 40A. The TX terminals 10B of the plurality of semiconductor devices 10 are connected in common to the TXD terminal 40B.

The reception data RX output from the RXD terminal 40A is input to the RX terminal 10A of each of the plurality of semiconductor devices 10. A device address of one of the plurality of semiconductor devices 10 is specified in the reception data RX. Further, the transmission data TX output from the TX terminal 10B of each of the plurality of semiconductor devices 10 is input to the TXD terminal 40B.

2. Configuration of Semiconductor Device

Figure 2:
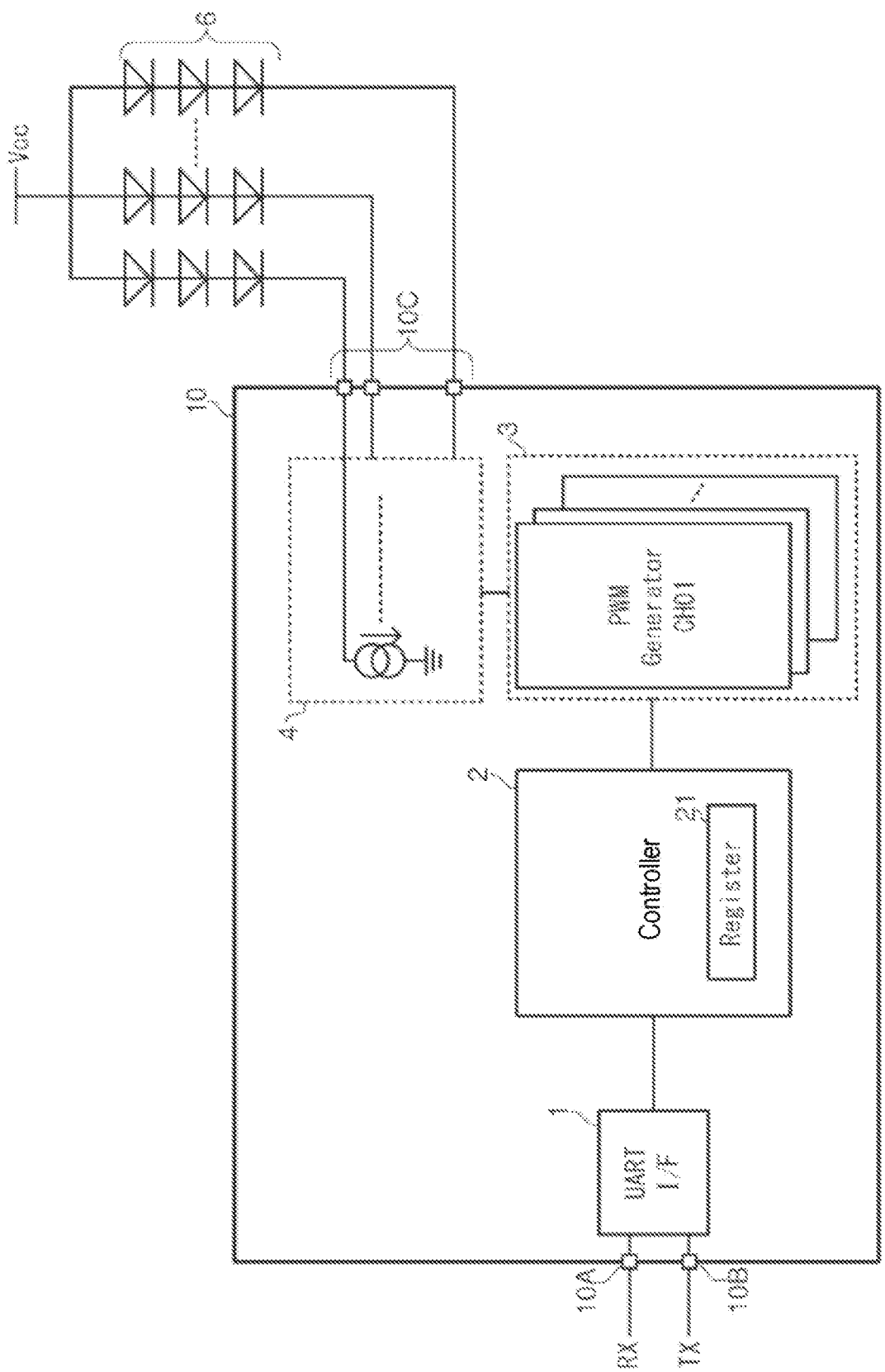
FIG. 2 is a diagram showing a configuration of a semiconductor device according to an exemplary embodiment of the present disclosure.

FIG. 2 is a diagram showing a configuration of the semiconductor device 10 according to an exemplary embodiment of the present disclosure. The semiconductor device 10 shown in FIG. 2 is configured as an LED driver IC configured to drive an LED 6. The LED is an example of a light emitting element. That is, the LED driver is an example of a light emitting element driving device.

The LED 6 is provided to include multiple channels. Hereinafter, it is assumed that the channels of the LED 6 are 24 channels as an example. The channels of the LED 6 may be multiple channels other than 24 channels. The LED 6 of each channel is configured by connecting LED elements in series. However, the LED 6 of each channel may be configured by connecting LED elements in series and parallel, or may be configured with a single LED element.

The semiconductor device 10 includes a UART interface 1, a controller 2, a PWM generator 3, and a current driver 4 in an integrated manner. Further, the semiconductor device 10 also includes an RX terminal 10A, a TX terminal 10B, and a cathode terminal 10C as external terminals for establishing electrical connection with the outside.

As described above, the reception data RX input from the outside to the RX terminal 10A is input to the UART interface 1. Further, as described above, the transmission data TX outputted from the UART interface 1 is outputted to the outside from the TX terminal 10B.

The controller 2 includes a register 21. When the reception data RX input to the UART interface 1 indicates write, the controller 2 updates the data of the register 21 based on the write data included in the reception data RX. On the other hand, when the reception data RX input to the UART interface 1 indicates read, the controller 2 reads the data from the register 21. Details of the RX data will be described later.

The PWM generator 3 is provided corresponding to each channel of the LED 6. Therefore, in a case where the LED 6 includes 24 channels, the PWM generator 3 is provided for each of channels CH01 to CH24. A channel CHn corresponds to an n-th channel. The register 21 stores dimming setting data for each channel. The PWM generator 3 of each channel generates an on-duty PWM signal based on the dimming setting data of each channel. That is, the dimming setting data of each channel represents the on-duty for PWM dimming of each channel.

The PWM signal is a pulse signal having a high level and a low level. In one cycle (PWM cycle), a period when the PWM signal is at a first level (for example, high level) is an on period, and a period when the PWM signal is at a second level (for example, low level) is an off period.

The current driver 4 is provided corresponding to each channel of the LED 6. Therefore, in a case where the LED 6 includes 24 channels, the current driver 4 is provided for each of channels CH01 to CH24. The current driver 4 of each channel is connected to a cathode of the LED 6 of each channel via each cathode terminal 10C. Anodes of the LEDs 6 of each channel are connected in common to an application terminal of a power supply voltage Vcc.

Each PWM signal generated by the PWM generator 3 of each channel is used for on/off control of the current driver 4 of each channel. Specifically, the current driver 4 is turned on during the on period of the PWM signal, and the current driver 4 is turned off during the off period of the PWM signal. When the current driver 4 is in the on state, a constant current flows through the LED 6, and the LED 6 emits light. When the current driver 4 is in the off state, no current flows through the LED 6, and the LED 6 is turned off. The on-duty of PWM dimming is a ratio of one cycle of the on-period. As the on-duty becomes higher, the LED 6 becomes brighter.

With this configuration, it is possible to update the dimming setting data of each channel based on the data RX received by UART communication, and perform PWM dimming of the LED 6 of each channel based on each on-duty set for each channel. As described below, in the present embodiment, it is also possible to update the dimming setting data of only some of the 24 channels (single channel or multiple channels) with a single communication of the reception data RX.

3. Structure of Reception Data

Figure 3:
FIG. 3 is a diagram showing a data structure of reception data RX.

FIG. 3 is a diagram showing the data structure of the reception data RX. In the UART, communication is performed in data units called frames. A frame is constituted by bit data from a start bit to a stop bit. The start bit is at a low level and the stop bit is at a high level. Bit data of a predetermined number of bits is arranged between the start bit and the stop bit. In the following, it is assumed that the predetermined number of bits is 8 bits as an example. In this case, the frame is constituted by 10 bits of bit data.

As shown in FIG. 3, the reception data RX includes a synchronization frame SYNC, a device frame Device, a data number frame NumofData, an address frame Address, data frames Data1 to DataN (N is an integer of 1 or more), a cyclic redundancy check (CRC) lower frame CRC16L, and a CRC upper frame CRC16H in order from the beginning.

The synchronization frame SYNC is bit data for setting a baud rate in the semiconductor device 10.

The device frame Device includes a device address, a Read/Write bit, and the like. The device address is bit data indicating an address of a target device (the semiconductor device 10). The Read/Write bit is bit data indicating read or write.

The data number frame NumofData is bit data indicating the number of frames (i.e., N) of the data frames Data1 to DataN.

The address frame Address is bit data indicating an address for accessing the register 21.

The data frames Data1 to DataN are bit data indicating data for updating data in the register 21. When the Read/Write bit in the device frame Device indicates read, the data frames Data1 to DataN are not included in the reception data RX.

The CRC lower frame CRC16L and the CRC upper frame CRC16H are bit data indicating error detection codes added to the data frames Data1 to DataN.

4. Update of Dimming Settings

Figure 4:
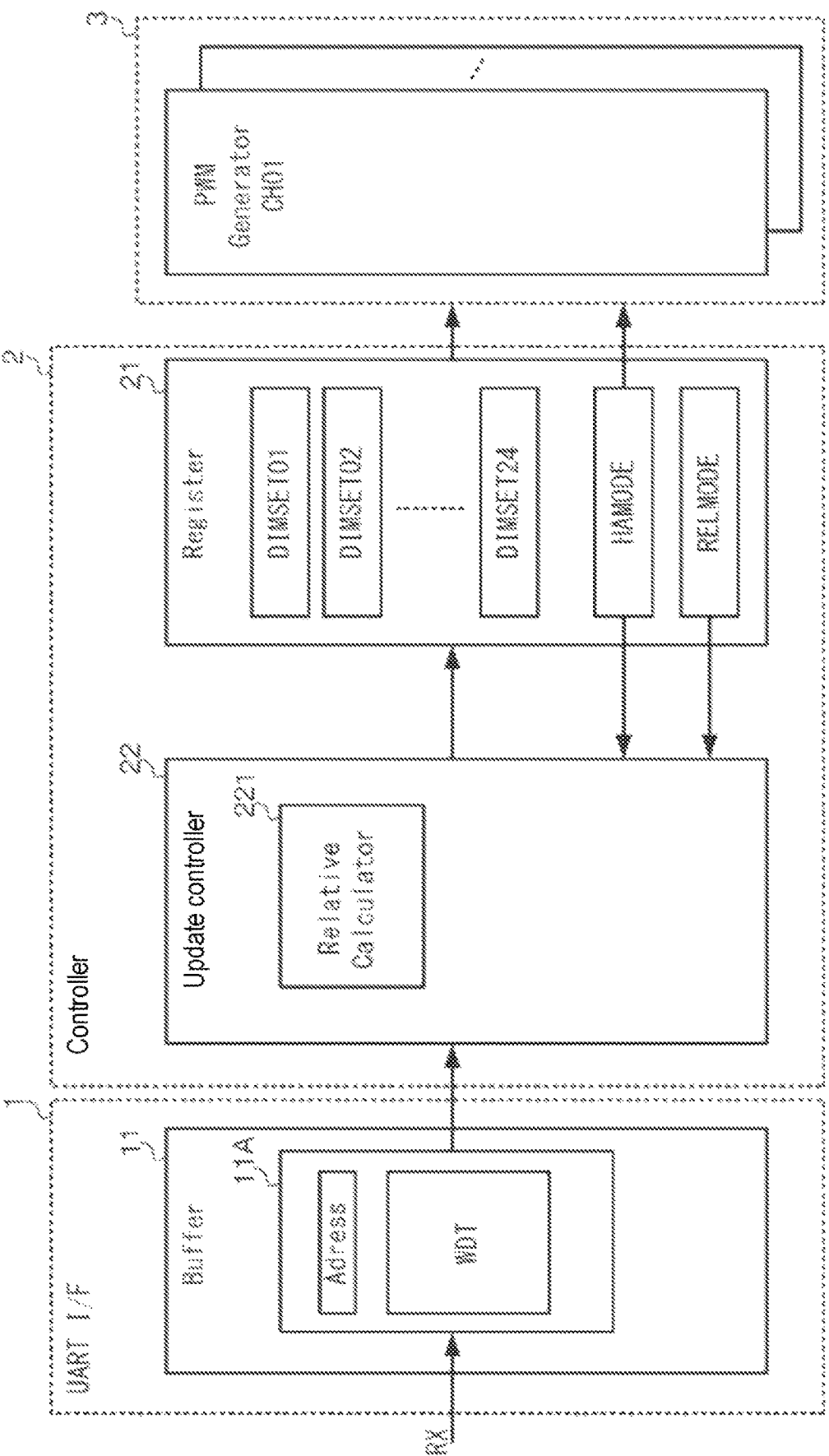
FIG. 4 is a diagram showing a configuration example regarding updating of dimming settings in a semiconductor device.

Next, a method of updating the dimming setting data in the register 21 will be described. FIG. 4 is a diagram showing a configuration example regarding updating of dimming settings in the semiconductor device 10.

As shown in FIG. 4, the UART interface 1 includes a buffer 11. When the reception data RX is input to the UART interface 1, reception data 11A is stored in the buffer 11. The reception data 11A includes address data Address and write data WDT. The write data WDT is data transmitted by using the data frames Data1 to DataN (FIG. 3).

The controller 2 includes the register 21 and an update controller 22. The update controller 22 updates dimming setting data DIMSET01 to DIMSET24 in the register 21 based on the reception data 11A. The update controller 22 includes a relative calculator 221. The relative calculator 221 is used in relative updating of dimming setting data, which is described below.

The dimming setting data DIMSET01 to DIMSET24 are stored in the register 21. The dimming setting data DIMSETn is the dimming setting of channel CHn, and indicates the on-duty of channel CHn. The on-duty is a value between 0 and 100%.

Resolution setting data HAMODE and relative mode setting data RELMODE are stored in the register 21.

The resolution setting data HAMODE is 1-bit data and indicates setting of a high resolution mode or a low resolution mode. The low resolution mode is a mode in which the dimming setting data DIMSETn is updated as a first predetermined number of bits (for example, 8 bits) and the on-duty may be adjusted with the resolution of the first predetermined number of bits. In a case where the first predetermined number of bits is, for example, 8 bits, the on-duty may be adjusted in steps of about 0.4%. The high resolution mode is a mode in which the dimming setting data DIMSETn is updated as a second predetermined number of bits (for example, 12 bits) higher than the first predetermined number of bits and the on-duty may be adjusted with the resolution of the second predetermined number of bits. In a case where the second predetermined number of bits is, for example, 12 bits, the on-duty may be adjusted in steps of about 0.02%.

The relative mode setting data RELMODE is 1-bit data and indicates setting of a relative mode or an absolute mode. The relative mode is a mode in which the dimming setting data DIMSETn is updated by a relative change from the current value. The absolute mode is a mode in which the dimming setting data DIMSETn is updated with an absolute value.

<<In Case of Low Resolution Mode>>

Hereinafter, a method of updating the dimming setting data when the resolution mode is set to the low resolution mode (HAMODE=0) will be described. Herein, it is assumed that the first predetermined number of bits is 8 bits, as an example.

FIG. 5 is a diagram (register map) showing storage of the dimming setting data DIMSETn in the register 21 in the low resolution mode. FIG. 5 shows a corresponding relationship between addresses in the register 21 and the dimming setting data DIMSETn stored at the addresses. As shown in FIG. 5, in the register 21, the number of bits of data that can be stored for one address is a first predetermined number of bits (herein, 8 bits). The specific addresses shown in the drawings after FIG. 5 are merely examples.

DIMSET01 to DIMSET24, each having 8 bits, are stored in consecutive addresses from an address 0x4B to an address 0x62, respectively.

FIG. 6 is a register map regarding settings for updating dimming settings in the register 21. As shown in FIG. 6, a channel setting flag PAFLG is stored for consecutive addresses from an address 0x7B to an address 0x7D. The channel setting flag PAFLG is 24-bit data, and each bit of the channel setting flag PAFLG indicates whether or not the dimming setting data is updated for each of the 24 channels.

Lower 8 bits of the channel setting flag PAFLG are stored in the address 0x7B, middle 8 bits of the channel setting flag PAFLG are stored in the address 0x7C, and upper 8 bits of the channel setting flag PAFLG are stored in the address 0x7D. The lower 8 bits of the channel setting flag PAFLG correspond to channels CH01 to CH08 in order from the lower bit to the upper bit. The middle 8 bits of the channel setting flag PAFLG correspond to channels CH09 to CH16 in order from the lower bit to the upper bit. The upper 8 bits of the channel setting flag PAFLG correspond to channels CH17 to CH24 in order from the lower bit to the upper bit.

Further, as shown in FIG. 6, duty setting data DutyDT01 to DutyDTm are stored in consecutive order starting from an address 0x7E. Herein, m may take a value from 01 to 24. The duty setting data DutyDT indicates an on-duty setting value of a channel, which is set as having update by the channel setting flag PAFLG, and has 8 bits for one channel. Herein, m is the number of channels set as having update by the channel setting flag PAFLG. The duty setting data DutyDT is data for updating the dimming setting data DIMSETn with an absolute value.

When updating the dimming setting data DIMSETn, the following transmission is performed by using the reception data RX (FIG. 3). The address 0x7B is specified in the address frame Address. Further, the lower 8 bits, the middle 8 bits, and the upper 8 bits of the channel setting flag PAFLG, and the duty setting data DutyDT for the channels set as having update by the channel setting flag PAFLG are transmitted in order by using the data frames Data1 to DataN.

Figure 7:
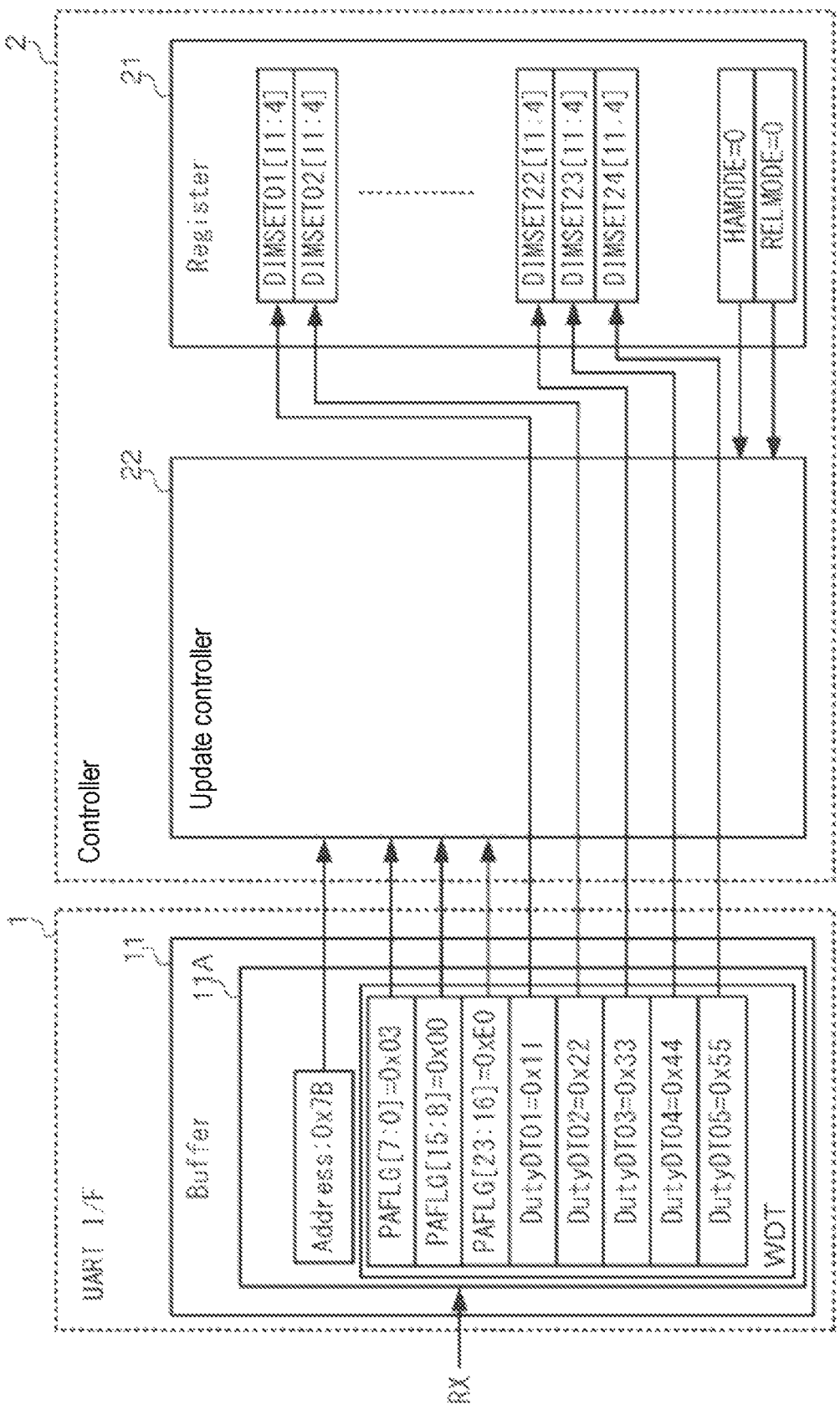
FIG. 7 is a configuration diagram showing an example of updating of dimming setting data in a low resolution mode and an absolute mode.

FIG. 7 is a configuration diagram (corresponding to FIG. 4) showing an example of updating the dimming setting data DIMSETn in the case of low resolution mode and absolute mode (HAMODE=0 and RELMODE=0).

In the example of FIG. 7, the reception data RX is input to the UART interface 1, and the reception data 11A is stored in the buffer 11. The reception data 11A includes the address 0x7B and the write data WDT. The write data WDT includes lower 8 bits (PAFLG[7:0]), middle 8 bits (PAFLG[15:8]), and upper 8 bits (PAFLG[23:16]) of the channel setting flag PAFLG, and the duty setting data DutyDT01 to 05. Herein, as an example, PAFLG[7:0]=0x03 (00000011), PAFLG[15:8]=0x00, and PAFLG[23:16]=0xE0 (11100000). Since PAFLG=1 indicates that there is an update, and PAFLG=0 indicates that there is no update, the channels set as having update are channels CH01, CH02, CH22, CH23, and CH24. As a result, the duty setting data DutyDT is set to DutyDT01 to DutyDT05.

Based on the channel setting flag PAFLG and the duty setting data DutyDT in the write data WDT stored in the buffer 11, the update controller 22 updates the channel setting flag PAFLG and the duty setting data DutyDT (FIG. 6) at consecutive addresses starting from the address 0x7B in the register 21. Then, based on the data updated in this way, the update controller 22 updates the dimming setting data DIMSETn corresponding to the channel set as having update in the register 21. In the example of FIG. 7, each of DIMSET01, 02, 22, 23, and 24 corresponding to channels CH01, CH02, CH22, CH23, and CH24 that are set as having update is updated with an absolute value by each of the duty setting data DutyDT01 to 05.

In this way, in the present embodiment, the dimming setting data of only some of the 24 channels can be updated. In the case of a method of transmitting the dimming setting data of all 24 channels by the reception data RX in order to update the dimming setting data of only some channels (a method according to a first comparative example), required transmission data is 24ch×1 byte+6 bytes (SYNC, Device, NumofData, Address, CRC16L, CRC16H)=30 bytes.

In addition, in order to update the dimming setting data of only some channels, assume that a method of transmitting the reception data RX in a group of consecutive channels from the channel CH01 set as having update and a group of consecutive channels from the channel CH24 set as having update (a method according to a second comparative example) is adopted. In this case, in the example of FIG. 7, since the group of consecutive channels set as having update is divided into a group of channels CH01 and CH02 and a group of channels CH22, CH23, and CH24, it is necessary to transmit the reception data RX twice. Required transmission data is 17 bytes which are a sum of 2ch×1 byte+6 bytes and 3ch×1 byte+6 bytes.

In contrast, in this embodiment, in the example of FIG. 7, the transmission of the reception data RX is completed once, and the required transmission data is 3 bytes (PAFLG)+1 byte×5 (DutyDT01 to DutyDT05)=8 bytes, making it possible to reduce a communication data amount.

In this embodiment, it is possible to set the dimming setting data for any portion of the 24 channels and a degree of freedom in setting is higher than that in the method according to the second comparative example.

<<In Case of High Resolution Mode>>

Hereinafter, a method of updating the dimming setting data when the resolution mode is set to the high resolution mode (HAMODE=1) will be described. Herein, it is assumed that the second predetermined number of bits is 12 bits, as an example.

FIG. 8 is a register map showing storage of the dimming setting data DIMSETn in the register 21 in the high resolution mode.

Upper 8 bits of DIMSET01 are stored in the address 0x4B. Lower 4 bits of DIMSET01 are stored in an upper part of the address 0x4C, and lower 4 bits of DIMSET02 are stored in a lower part of the address 0x4C. Upper 8 bits of DIMSET02 are stored in the address 0x4D. Similar to such a storage pattern of dimming setting data in the addresses 0x4B to 0x4D, DIMSET03 to DIMSET24 are also stored in the address 0x4E and the subsequent addresses. In this way, 12 bits of DIMSET01 to DIMSET24 can be stored in each of the consecutive addresses from 0x4B to 0x6E.

FIG. 9 is a register map related to settings for updating of dimming settings in the register 21 in the case of the high resolution mode. As shown in FIG. 9, a channel setting flag PAFLG is stored for consecutive addresses 0x7B to 0x7D. The channel setting flag PAFLG is as described above.

Further, polarity data SG01 to SGm, gain data GAIN01 to GAINm, and relative value data DUTY01 to DUTYm are stored in consecutive order starting from the address 0x7E. Herein, m can take a value from 01 to 24. Polarity data SG, gain data GAIN, and relative value data DUTY for one address correspond to one channel.

The polarity data SG is 1-bit data and indicates a decrease or an increase from a value of the current dimming setting data DIMSETn. For example, SG=0 indicates a decrease, and SG=1 indicates an increase.

The gain data GAIN is 2-bit data and indicates a gain value. For example, GAIN=0 indicates a 1×gain, GAIN=1 indicates a 2×gain, GAIN=2 indicates an 8×gain, and GAIN=3 indicates a 16×gain.

The relative value data DUTY is 5-bit data and indicates a relative change value. The relative value data DUTY can take values from 0 to 31.

By using the polarity data SG, the gain data GAIN, and the relative value data DUTY, the dimming setting data DIMSETn of the channel CHn is updated according to the following equation (1).

$$DIMSETn = DIMSETn \pm DUTY \times GAIN \quad (1)$$

DIMSETn on the right side indicates a current value, and DIMSETn on the left side indicates an updated value. Further, ± indicates + (increase) or − (decrease) according to the polarity data SG.

For example, when SG=0, GAIN=1, and DUTY=5, DIMSETn=DIMSETn-5×2.

When the mode is set to the high resolution mode and the relative mode (RELMODE=1), the following transmission is performed by using the reception data RX (FIG. 3) when updating the dimming setting data DIMSETn. The address 0x7B is specified in the address frame Address. Further, the lower 8 bits, the middle 8 bits, and the upper 8 bits of the channel setting flag PAFLG and the polarity data SG, gain data GAIN, and relative value data DUTY for the channel set as having update by the channel setting flag PAFLG are sequentially transmitted by using the data frames Data1 to DataN.

Figure 10:
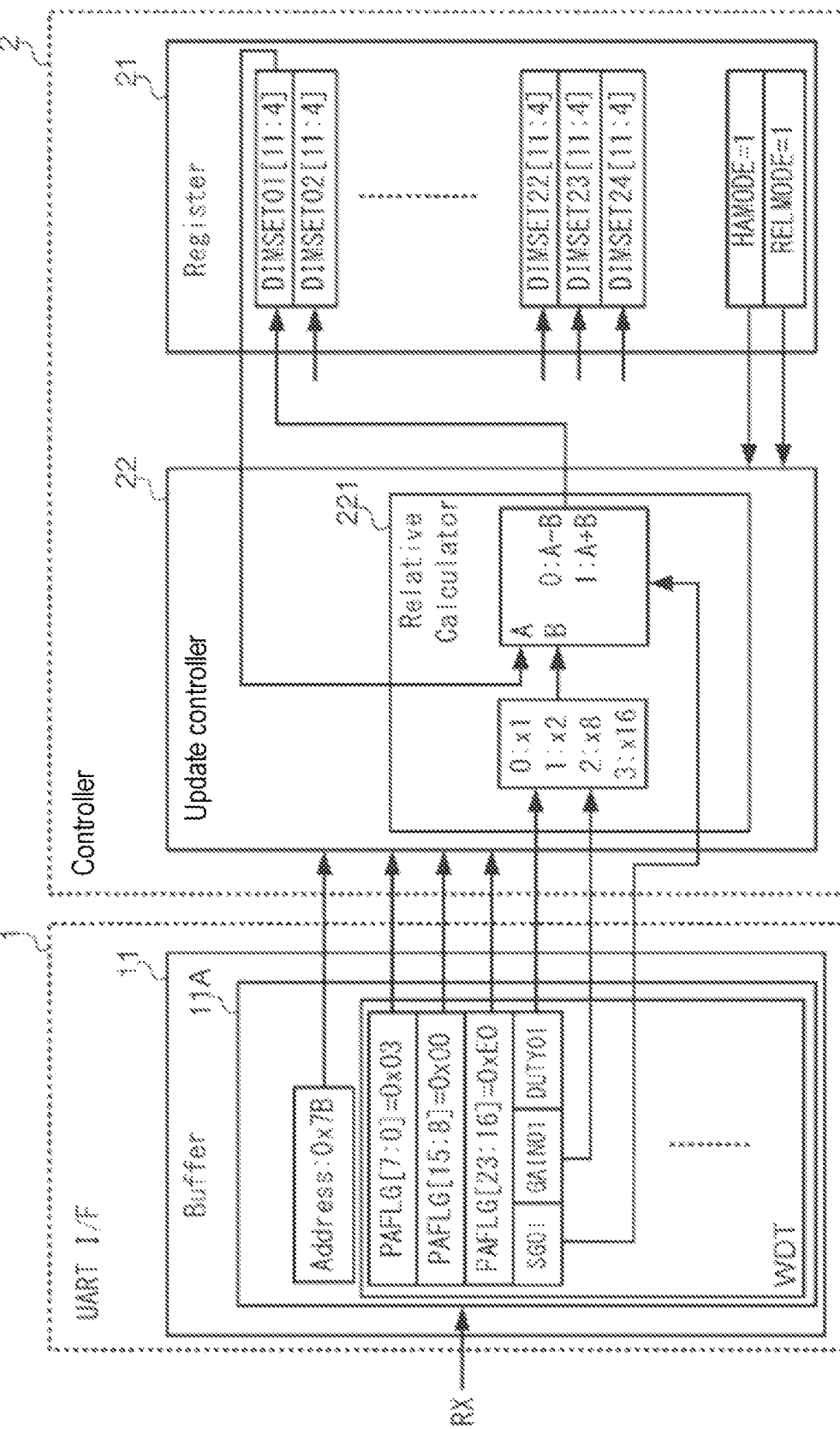
FIG. 10 is a configuration diagram showing an example of updating of dimming setting data in a high resolution mode and a relative mode.

FIG. 10 is a configuration diagram (corresponding to FIG. 4) showing an example of updating the dimming setting data DIMSETn in the case of high resolution mode and relative mode (HAMODE=1 and RELMODE=1).

In the example of FIG. 10, the reception data RX is input to the UART interface 1, and the reception data 11A is stored in the buffer 11. The reception data 11A includes the address 0x7B and the write data WDT. The write data WDT includes the lower 8 bits (PAFLG[7:0]), the middle 8 bits (PAFLG[15:8]), and the upper 8 bits (PAFLG[23:16]) of the channel setting flag PAFLG, the polarity data SG, the gain data GAIN, and the relative value data DUTY. Herein, as an example, PAFLG[7:0]=0x03 (00000011), PAFLG[15:8]=0x00, and PAFLG[23:16]=0xE0 (11100000). Therefore, the channels set as having update are channels CH01, CH02, CH22, CH23, and CH24. As a result, the polarity data SG, the gain data GAIN, and the relative value data DUTY are set to SG01 to SG05, GAIN01 to GAIN05, and DUTY01 to 05, respectively.

Based on the channel setting flag PAFLG, the polarity data SG, the gain data GAIN, and the relative value data DUTY in the write data WDT stored in the buffer 11, the update controller 22 updates the channel setting flag PAFLG, the polarity data SG, the gain data GAIN, and the relative value data DUTY (FIG. 9) at consecutive addresses starting from the address 0x7B in the register 21. Then, based on the data updated in this way, the update controller 22 updates the dimming setting data DIMSETn corresponding to the channel set as having update in the register 21. In the example of FIG. 10, each of DIMSET01, DIMSET02, DIMSET22, DIMSET23, and DIMSET24 corresponding to channels CH01, CH02, CH22, CH23, and CH24 that are set as having update is updated by the following calculation of the relative calculator 221.

The relative calculator 221 performs calculation using the above-mentioned equation (1). In the example of FIG. 10, for example, for the channel CH01, the dimming setting data DIMSET01 is updated by:

$$DIMSET01 = DIMSET01 \pm DUTY01 \times GAIN01.$$

Herein, ± indicates + or − according to the polarity data SG01. In FIG. 10, updates of the dimming setting data for channels other than the channel CH01 are not shown.

Figure 11:
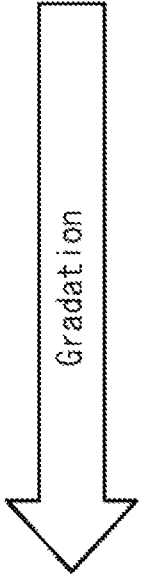
FIG. 11 is a diagram showing an example of a corresponding relationship between an on-duty range and a step of changing the on-duty when performing gradation dimming.

As described above, in this embodiment, it is possible to relatively update the high-resolution (for example, 12-bit) dimming setting data DIMSETn for some of the 24 channels. Herein, FIG. 11 is a diagram showing an example of a corresponding relationship between an on-duty range and a step of changing the on-duty when performing gradation dimming. In this way, as the duty becomes higher, the step becomes larger. In the gradation dimming, the on-duty is increased from a current value to a target value in specified steps. By expressing the on-duty with high resolution, the minimum step can be made smaller. In such gradation dimming, since required steps are small, dimming can be performed by updating the dimming setting data in the relative mode.

When updating the dimming setting data for 5 channels as in the example of FIG. 10, in the absolute mode, at least data transmission of 3 bytes (PAFLG)+5ch×12 bits=10.5 bytes is required. However, in the relative mode, data transmission of 3 bytes+5ch×8 bits=8 bytes is completed, making it possible to reduce a communication data amount.

Further, as shown in FIG. 1, when the RX terminals 10A of the plurality of semiconductor devices 10 are connected in common to the same RXD terminal 40A of the CAN transceiver 40, it is assumed that the plurality of semiconductor devices 10 are LED driver ICs. In this case, when updating the dimming setting data in each of the plurality of semiconductor devices 10, it is necessary to transmit the reception data RX to each of the plurality of semiconductor devices 10 in turn by serial communication, and it is effective to reduce a communication data amount in a single transmission in the low resolution mode and the high resolution mode.

<<Check of NumofData>>

When the reception data RX is transmitted, the update controller 22 checks the data number frame NumofData as follows. Specifically, for the channel setting flag PAFLG included in the write data WDT stored in the buffer 11, it is checked whether the following equation holds true.

Number of bytes of PAFLG+Number of channels set as having update by PAFLG=Number of frames indicated by data number frame NumofData    (2)

In a case where the equation (2) holds true, the process proceeds to update control of the dimming setting data DIMSETn.

For example, in the examples of FIGS. 7 and 10, since the number of bytes in PAFLG=3 and the number of channels set as having update in PAFLG=5, it is checked whether the number of frames indicated by the data number frame NumofData=8.

5. Others

In addition to the above-described embodiments, the various technical features disclosed in the present disclosure can be modified in various ways without departing from the gist of its technical features. That is, the above-described embodiments should be considered to be illustrative in all respects and not restrictive, the technical scope of the present disclosure should not limited to the above-described embodiments, and it should be understood that the technical scope of the present disclosure includes all changes that fall within the meaning and range equivalent to the claims.

For example, the serial communication is not limited to the UART communication, but may also be I²C communication or the like.

6. Supplementary Notes

As described above, a semiconductor device (10) according to an aspect of the present disclosure has a configuration (first configuration) that it includes:
an interface (1) configured to receive write data (WDT) transmitted via serial communication from outside;
a register (21) configured to store setting data (DIMSETn) corresponding to multiple channels; and
an update controller (22) configured to update the setting data based on the write data,
wherein the write data includes:
first data (PAFLG) comprising a plurality of bits, wherein the plurality of bits correspond to the multiple channels, respectively, and each bit among the plurality of bits indicates whether or not there is a data update for a corresponding channel among the multiple channels; and
second data (DutyDT) comprising one or more update values of the setting data respectively for one or more channels, among the multiple channels, for which the first data indicates whether there are one or more data updates.

According to the above configuration, it is possible to reduce an amount of transmission data including write data necessary for updating the setting data of the multiple channels. Therefore, it is possible to solve a problem of reducing a communication data amount of serial communication when setting data for the multiple channels.

Further, the semiconductor device of the first configuration may have a configuration (second configuration) that the number of bits of data which is capable of being stored for one address in the register is a first predetermined number of bits (for example, 8 bits), and the first data and the second data are transmitted with the first predetermined number of bits being used as each of data units.

Further, the semiconductor device of the second configuration may have a configuration (third configuration) that the setting data (DIMSETn) for one channel is the first predetermined number of bits, and the setting data of one channel is updated with an absolute value by the second data in each of the data units.

Further, the semiconductor device of the second or third configuration may have a configuration (fourth configuration) that in a high resolution mode, the setting data for one channel is a second predetermined number of bits (for example, 12 bits) larger than the first predetermined number of bits, the second data in each of the data units includes polarity data (SG) indicating a decrease or an increase, gain data (GAIN) indicating a gain value, and relative value data (DUTY) indicating a relative change value, corresponding to one channel, the update controller includes a relative calculator (221) configured to calculate a calculation result by subtracting or adding a value obtained by multiplying the relative change value by the gain value from or to a current value of the setting data according to the polarity data, and the update controller updates the setting data based on the calculation result.

Further, the semiconductor device of the fourth configuration may have a configuration (fifth configuration) that the gain value is capable of being set to one based on the gain data.

Further, the semiconductor device of the fourth or fifth configuration may have a configuration (sixth configuration) that in the high resolution mode, in the register, upper bits of the setting data of a first channel are stored in a first address, lower bits of the setting data of the first channel and the lower bits of the setting data of a second channel are stored in a second address obtained by incrementing the first address, and upper bits of the setting data of the second channel are stored in a third address obtained by incrementing the second address.

Further, the semiconductor device of any one of the first to sixth configuration may have a configuration (seventh configuration) that the setting data indicates a duty of PWM dimming.

Further, the semiconductor device of the fourth configuration may have a configuration (eighth configuration) that the setting data indicates a duty of PWM dimming, as an on-duty of the PWM dimming becomes higher, a step by which the on-duty is changed becomes larger, and gradation dimming in which the on-duty is increased according to the step is capable of being performed.

The semiconductor device of the second configuration may have a configuration (ninth configuration) that data frames each including data of the first predetermined number of bits and a data number indicating the number of the data frames are capable of being transmitted by the serial communication, and the update controller checks whether or not a sum of the number of the data units of the first data and the number of the channels set as having the data update by the first data matches the data number.

Further, the semiconductor device of the ninth configuration may have a configuration (tenth configuration) that the serial communication is UART communication.

Further, a communication system (501) according to another aspect of the present disclosure has a configuration (eleventh configuration) that it includes:

at least one semiconductor device (10) of any one of the first to tenth configurations; and a transmitter (40) configured to transmit the write data.

Further, the communication system of the eleventh configuration may have a configuration (twelfth configuration) that the at least one semiconductor device (10) includes a plurality of semiconductor devices (10), and input terminals (10A) respectively provided at the plurality of semiconductor devices (10) and configured to receive the write data are connected in common to the same output terminal (40A) provided at the transmitter (40).

INDUSTRIAL APPLICABILITY

The present disclosure can be used, for example, in an in-vehicle communication system.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A semiconductor device comprising:
an interface configured to receive write data transmitted via serial communication from outside;
a register configured to store setting data corresponding to multiple channels; and
an update controller configured to update the setting data based on the write data,
wherein the write data includes:
first data comprising a plurality of bits, wherein the plurality of bits correspond to the multiple channels, respectively, and each bit among the plurality of bits indicates whether or not there is a data update for a corresponding channel among the multiple channels; and
second data comprising one or more update values of the setting data respectively for one or more channels, among the multiple channels, for which the first data indicates whether there are one or more data updates, and
wherein the update controller is further configured to update the setting data for only the one or more channels, for which the first data indicates whether there are one or more data updates, based on the second data.

2. The semiconductor device of claim 1, wherein the number of bits of data which is capable of being stored for one address in the register is a first predetermined number of bits, and
wherein the first data and the second data are transmitted with one or more data frames, each data frame comprising data of the first predetermined number of bits.

3. The semiconductor device of claim 2, wherein the setting data of one channel is the first predetermined number of bits, and
wherein the setting data of one channel is updated with an absolute value by the second data transmitted with one data frame comprising data of the first predetermined number of bits.

4. The semiconductor device of claim 2, wherein in a high resolution mode, the setting data of one channel is a second predetermined number of bits larger than the first predetermined number of bits,
wherein the second data transmitted with one data frame comprising data of the first predetermined number of bits includes polarity data indicating a decrease or an increase, gain data indicating a gain value, and relative value data indicating a relative change value, corresponding to one channel,
wherein the update controller includes a relative calculator configured to calculate a calculation result by subtracting or adding a value obtained by multiplying the relative change value by the gain value from or to a current value of the setting data according to the polarity data, and
wherein the update controller updates the setting data based on the calculation result.

5. The semiconductor device of claim 4, wherein the gain value is capable of being set to one based on the gain data.

6. The semiconductor device of claim 4, wherein in the high resolution mode, in the register, upper bits of the setting data of a first channel are stored in a first address, lower bits of the setting data of the first channel and lower bits of the setting data of a second channel are stored in a second address obtained by incrementing the first address, and upper bits of the setting data of the second channel are stored in a third address obtained by incrementing the second address.

7. The semiconductor device of claim 1, wherein the setting data indicates a duty cycle of Pulse Width Modulation (PWM) dimming.

8. The semiconductor device of claim 4, wherein the setting data indicates a duty of PWM dimming, and
wherein as an on-duty of the PWM dimming becomes higher, a step by which the on-duty is changed becomes larger, and gradation dimming in which the on-duty is increased according to the step is capable of being performed.

9. The semiconductor device of claim 2, wherein data frames each including data of the first predetermined number of bits and a data number frame indicating the number of the data frames are capable of being transmitted by the serial communication, and wherein the update controller checks whether or not a sum of the number of the data frames comprising the first data and the number of the one or more channels, among the multiple channels, for which the first data indicates whether there are one or more data updates, matches the data number.

10. The semiconductor device of claim 9, wherein the serial communication is UART communication.

11. A communication system comprising:
at least one semiconductor device of claim 1; and
a transmitter configured to transmit the write data.

12. The communication system of claim 11, wherein the at least one semiconductor device includes a plurality of semiconductor devices, and
wherein input terminals respectively provided at the plurality of semiconductor devices and configured to receive the write data are connected in common to the same output terminal provided at the transmitter.

13. A semiconductor device comprising:
an interface configured to receive write data transmitted via serial communication from outside;
a register configured to store setting data corresponding to multiple channels; and
an update controller configured to update the setting data based on the write data,
wherein the write data includes:
first data comprising a plurality of bits, wherein the plurality of bits correspond to the multiple channels, respectively, and each bit among the plurality of bits indicates whether or not there is a data update for a corresponding channel among the multiple channels; and
second data comprising one or more update values of the setting data respectively for one or more channels, among the multiple channels, for which the first data indicates whether there are one or more data updates,
wherein the number of bits of data which is capable of being stored for one address in the register is a first predetermined number of bits,
wherein the first data and the second data are transmitted with one or more data frames, each data frame comprising data of the first predetermined number of bits,
wherein in a high resolution mode, the setting data of one channel is a second predetermined number of bits larger than the first predetermined number of bits,
wherein the second data transmitted with one data frame comprising data of the first predetermined number of bits includes polarity data indicating a decrease or an increase, gain data indicating a gain value, and relative value data indicating a relative change value, corresponding to one channel,
wherein the update controller includes a relative calculator configured to calculate a calculation result by subtracting or adding a value obtained by multiplying the relative change value by the gain value from or to a current value of the setting data according to the polarity data, and
wherein the update controller updates the setting data based on the calculation result.

14. The semiconductor device of claim 13, wherein the gain value is capable of being set to one based on the gain data.

15. The semiconductor device of claim 13, wherein in the high resolution mode, in the register, upper bits of the setting data of a first channel are stored in a first address, lower bits of the setting data of the first channel and lower bits of the setting data of a second channel are stored in a second address obtained by incrementing the first address, and upper bits of the setting data of the second channel are stored in a third address obtained by incrementing the second address.

16. The semiconductor device of claim 13, wherein the setting data indicates a duty cycle of Pulse Width Modulation (PWM) dimming, and wherein as an on-duty of the PWM dimming becomes higher, a step by which the on-duty is changed becomes larger, and gradation dimming in which the on-duty is increased according to the step is capable of being performed.

* * * * *